Patented June 30, 1953

2,643,978

UNITED STATES PATENT OFFICE 2,643,978

METHOD OF INHIBITING CORROSION OF METALS

William B. Hughes, Bartlesville, Okla., assignor to Cities Service Research and Development Company, New York, N. Y., a corporation of New Jersey No Drawing. Application February 24, 1951, Serial No. 212,682

12 Claims. (Cl. 252—8.55)

This invention relates to inhibiting corrosion of metals and is more particularly concerned with improved compositions and processes for treating natural petroleum oil-brine mixtures to reduce their corrosive action upon production, transmission, storage and other oil field equipment.

It is a well-known fact that many oil producing formations yield with the crude oil a brine which is extremely corrosive in its action upon metal tubing, casings, pumps, and other oil producing and collection equipment, and that this type of corrosion is particularly noticeable in wells producing brines containing dissolved hydrogen sulfide, carbon dioxide, or other acidic materials. The problem is also complicated by the fact that the corrosive nature of the brine will vary from well to well and corrosion inhibiting compositions which are effective at one location are not necessarily effective at others.

Various compositions have been proposed in the past for inhibiting such corrosion, some water-soluble, and some oil-soluble. Since it has been found that if a sufficient amount of inhibitor is incorporated into either the brine phase or the oil phase of the well fluids, corrosion may be substantially inhibited, it has been the practice to use water-soluble inhibitors, such as those disclosed in U. S. Patent 2,496,596 to Moyer and Hersh, in wells producing only small amounts of brine per barrel of well fluid, and conversely, oil-soluble inhibitors in wells producing only small amounts of oil per barrel of well fluid. By so proceeding it is possible to reduce to a minimum the amount of inhibitor required to effectively reduce corrosion.

It is an object of this invention to provide a series of oil-soluble compounds which are highly effective in reducing corrosion in wells producing corrosive brines, and particularly useful for substantially preventing corrosion in wells producing but small quantities of oil per barrel of well fluid.

I have discovered that products having the above desirable characteristics may be prepared by reacting either triethylenetetramine or tetraethylenepentamine with a equimolar quantity of aldehyde, and heating to drive off water which is formed in the reaction. The reaction product is then cooled and a second equimolar quantity of aldehyde is added. The reaction product of the final reaction is again heated to expel water formed in the reaction, thereby producing the finished inhibitor.

It appears that any aldehyde may be used in the reaction including aliphatic, aromatic, or heterocyclic aldehydes. Typical aldehydes which I have found useful in formulating my new compositions include formaldehyde, acetaldehyde, heptaldehyde and higher aliphatic aldehydes, furfural and benzaldehyde.

It is believed that the main product formed by the reaction of the amine and aldehyde in the first reaction step is an imidazolidine having the structural formula

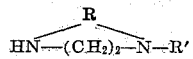

in which R is the aldehyde residue and R' is the amine residue. However, reactions of this type may take such various forms that it is quite probable that other compounds of unknown structure are formed.

The end product obtained after the second reaction step may include a bis-imidazoline of the formula

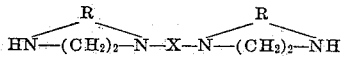

in which R is the aldehyde residue and X may be $(CH_2)_2$ or $(CH_2)_2$ NH $(CH_2)_2$, but it is not believed that this compound is formed to the exclusion of other compounds, since it has been noted that in the second step not much more than half of the theoretical amount of water which would be split out in forming the above type compound is recovered overhead in the heating step. Obviously some compounds must be formed which contain either oxygen linkages or hydroxyl groups. Since, as pointed out, the exact composition of my new products is not fully known, and since the unknown compounds may exert a synergistic effect in the composition, I do not wish to be limited in this application to any particular structure of the corrosion inhibiting compounds.

In preparing my new compositions I slowly add to a quantity of tetraethylenepentamine or triethylenetetramine an equimolar quantity of an aldehyde. I then heat the mixture in order to drive off water formed in the reaction. I have found that in general heating to 190° C. for a period of about two hours is sufficient to dehydrate the mixture, but this time will vary within wide limits depending upon the size of the batch and the particular aldehyde used. It is considered that the reaction and dehydration is completed when 90% of the theoretical amount of water formed has been driven overhead.

The reaction mixture is then cooled and a second equimolar quantity of aldehyde is added. This aldehyde may be either the same aldehyde as is used in the first step or it may be a different aldehyde. Apparently no great difference in results is obtained no matter which aldehyde is chosen, although there may be differences between the compounds when tested in brines from different sources. After addition of the second aldehyde the mixture is heated under reflux for a period of about four to six hours. The heating is then continued at about 190° C. for about four hours, the water driven off being trapped overhead. When about 60 per cent of the theoretical amount of water, which would be formed if the aldehyde oxygen were completely converted to water, is collected overhead, the reaction is considered complete, since it has been found that even prolonged heating will not materially increase water production.

It should be noted that the aldehyde must be added quite slowly to the amine or to the intermediate reaction product, since the reaction proceeds spontaneously with the evolution of considerable heat, and if the aldehyde is added too fast the mixture tends to boil over. If desired, benzene may be added in either step prior to the addition of the aldehyde, in order to render the mixture more fluid during the reaction, and also to act as an entrainer in carrying the water overhead in the dehydrating step.

The effectiveness of my compositions in inhibiting the corrosiveness of oil field brines may be better and more fully understood by reference to certain tests which I have conducted using natural brines taken from producing wells together with oil from the same well. The test procedure, as hereafter described, involved a measurement of the corrosive action of these well fluids, as inhibited with the compositions described above, upon test strips of hot rolled steel, and a comparison thereof with the results obtained by subjecting identical test strips to the corrosive action of well fluids alone.

In testing the compositions, cleaned and numbered one-quart bottles were purged with natural gas. Oil saturated with hydrogen sulfide by bubbling the gas through the liquid for about three hours was added to the half-full mark on the bottle. Brine containing carbon dioxide and hydrogen sulfide in varying amounts as received from the well, was then added to almost completely fill the bottle. A quantity of my new compounds was then added to each bottle in an amount of 50 parts per million, based on the oil content of the bottle. The weighed steel strips were then affixed in such manner that the midpoint of the test strip was approximately at the interfacial level of the brine and oil.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

Changes in the weight of the test strips during the corrosion test were taken as a measurement of the effectiveness of the inhibitor compositions, expressed as a protection percentage. Thus if the blank lost, for example, 100 mg. during the course of the test and the test strip subjected to the brine and oil containing our inhibiting compositions lost 5 mg., the per cent effectiveness would be 95 per cent. In the same manner if the test strip exposed to the uninhibited well fluids lost say 50 mg., while the loss of the test strip exposed to the inhibited well fluids was 4 mg., then the percentage of protection would be 92 per cent.

Test results of a number of my new compositions using brines of different origins, are given in the following table. In all cases the amine used in the formulation of these compositions was triethylenetetramine.

| First Aldehyde | Second Aldehyde | Blank Loss | Test Loss | Percent Protection |
|---|---|---|---|---|
| Heptaldehyde | Benzaldehyde | 41.0 | 2.6 | 94 |
| Formaldehyde | Heptaldehyde | 41.0 | 1.8 | 96 |
| Do | Benzaldehyde | 41.0 | 1.7 | 96 |
| Do | Furfural | 41.0 | 2.8 | 93 |
| Heptaldehyde | Heptaldehyde | 41.0 | 1.8 | 95 |
| Do | Benzaldehyde | 53.3 | 2.1 | 96 |
| Formaldehyde | Furfural | 109.8 | 16.5 | 85 |
| Do | Formaldehyde | 109.8 | 5.2 | 95 |
| Do | Heptaldehyde | 109.8 | 4.1 | 96 |
| Do | Benzaldehyde | 109.8 | 6.8 | 94 |
| Heptaldehyde | Heptaldehyde | 109.8 | 4.3 | 96 |

It will thus be evident that corrosion may be reduced to a value of one tenth or less of the corrosion due to the natural flow of well fluids through the well tubing and gathering lines, by the incorporation of very minor quantities of our new compounds into the well fluid.

It will be apparent that, while an inhibitor concentration of 50 p. p. m. was established as a test standard for comparison purposes, more or less inhibitor may be used, and the protection obtained will vary according to the concentration of the inhibitor. In actual use in the field the concentration must, of course, be adjusted to the particular well, depending on the corrosiveness of the brine. Thus, in wells producing brines which are not particularly corrosive, it may be possible to use the inhibitor in concentrations as low as 10 p. p. m., while in wells producing strongly corrosive brines, it may be necessary to use concentrations of inhibitor far in excess of 50 p. p. m. In any event, the inhibitor will be added in a small amount, but in an amount sufficient to substantially inhibit the corrosion of metal producing and gathering equipment.

In using my improved compositions for protecting oil well tubing, casing, and other equipment which comes in contact with the corrosive oil brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The process of reducing corrosion of metals when exposed to corrosive oil well brines which comprises incorporating in corrosive oil well fluids a small but sufficient quantity of the reaction product prepared by first spontaneously reacting a polyethyleneamine selected from the group consisting of triethylenetetramine and tetraethylenepentamine with an approximately equimolar quantity of an aldehyde to form an intermediate reaction product, distilling water formed in the reaction from the mixture, spontaneously reacting the said intermediate reaction product with a second approximately equimolar quantity of an aldehyde and distilling water formed in the reaction from the reaction product, and thereafter causing the said well fluids to flow in contact with the metal to be protected.

2. The process according to claim 1 in which the first aldehyde is heptaldehyde and the second aldehyde is benzaldehyde.

3. The process according to claim 1 in which the first aldehyde is formaldehyde and the second aldehyde is heptaldehyde.

4. The process according to claim 1 in which the first aldehyde is formaldehyde and the second aldehyde is furfural.

5. The process according to claim 1 in which both aldehydes are heptaldehyde.

6. The process according to claim 1 in which the first aldehyde is formaldehyde and the second aldehyde is benzaldehyde.

7. The process of reducing corrosion of metals when exposed to corrosive oil well brines which comprises incorporating in corrosive oil well fluids a small but sufficient quantity of the reaction product prepared by adding about one mol of an aldehyde to one mol of a polyethyleneamine selected from the group consisting of triethylenetetramine and tetraethylenepentamine, heating to a temperature of about 190° C. for a time sufficient to drive off water formed in the reaction, cooling the reaction mixture, adding a second mol of aldehyde, heating the mixture under reflux for a period of from about four to about six hours, and finally heating the mixture at about 190° C. for a time sufficient to drive off the water formed in the reaction and thereafter causing the said well fluids to flow in contact with the metal to be protected.

8. The process according to claim 7 in which the first aldehyde is heptaldehyde and the second aldehyde is benzaldehyde.

9. The process according to claim 7 in which the first aldehyde is formaldehyde and the second aldehyde is heptaldehyde.

10. The process according to claim 7 in which the first aldehyde is formaldehyde and the second aldehyde is furfural.

11. The process according to claim 7 in which both aldehydes are heptaldehyde.

12. The process according to claim 7 in which the first aldehyde is formaldehyde and the second aldehyde is benzaldehyde.

WILLIAM B. HUGHES.

References Cited in the file of this patent

UNITED STATES PATENTS

| Number | Name | Date |
| --- | --- | --- |
| 1,771,985 | Calcott et al. | Aug. 5, 1930 |
| 2,426,318 | Menaul | Aug. 26, 1947 |
| 2,466,517 | Blair et al. | Apr. 5, 1949 |
| 2,468,163 | Blair et al. | Apr. 26, 1949 |
| 2,496,596 | Moyer et al. | Feb. 7, 1950 |
| 2,596,273 | Moyer et al. | May 13, 1952 |